(12) United States Patent
Rice et al.

(10) Patent No.: US 11,107,055 B2
(45) Date of Patent: Aug. 31, 2021

(54) NON-DEFAULT PAYMENT APPLICATION SELECTION DURING EMV-COMPLIANT PAYMENT TRANSACTION METHOD

(71) Applicant: Mastercard International Incorporated, Purchase, NY (US)

(72) Inventors: Enda Rice, Wezembeek-Oppem (BE); Florent Hay, Laeken (BE)

(73) Assignee: Mastercard International Incorporated, Purchase, NY (US)

( * ) Notice: Subject to any disclaimer, the term of this patent is extended or adjusted under 35 U.S.C. 154(b) by 56 days.

(21) Appl. No.: 16/597,365

(22) Filed: Oct. 9, 2019

(65) Prior Publication Data
US 2020/0134587 A1    Apr. 30, 2020

(30) Foreign Application Priority Data
Oct. 29, 2018   (EP) .................................. 18203146

(51) Int. Cl.
*G06Q 20/20*        (2012.01)
*G06Q 20/32*        (2012.01)
*G06Q 20/40*        (2012.01)

(52) U.S. Cl.
CPC ......... *G06Q 20/20* (2013.01); *G06Q 20/3278* (2013.01); *G06Q 20/40* (2013.01)

(58) Field of Classification Search
CPC ........................... G06Q 20/20; G06Q 20/3278
See application file for complete search history.

(56) References Cited

U.S. PATENT DOCUMENTS

2009/0108064 A1*  4/2009  Fernandes .............. G06Q 20/04
                                                                      235/380
2009/0192913 A1   7/2009  Saito et al.
(Continued)

FOREIGN PATENT DOCUMENTS

EP          3370196          9/2018
KR       1020110111801       10/2011
(Continued)

OTHER PUBLICATIONS

PCT International Search Report and Written Opinion from PCT Application No. PCT/US2020/014881 entitled Non-Default Payment Application Selection During EMV-Compliant Payment Transaction Method (dated May 20, 2020).
(Continued)

*Primary Examiner* — A. Hunter Wilder
(74) *Attorney, Agent, or Firm* — Hovey Williams LLP

(57) ABSTRACT

During recent years, chip-based payment has been changing from mainly physical, like a chipcard, to mainly virtual, such as a software application on a mobile device. Although such mobile devices are very powerful compared to a conventional chip card, the data interactions with POI terminals must still be compliant with the EMV specifications and standards.
A computer-implemented payment transaction method is provided comprising: providing a standard EMV Contactless payment transaction protocol POI terminal, receiving from the user interface a selection of either the first or second payment application and modifying the PPSE accordingly; continuing, by the POI terminal, said EMV-compliant payment transaction by selecting the modified PPSE of the identification device; and selecting, by the POI terminal, the user-selected payment application to continue the payment transaction.

(Continued)

By implementing such a function selection, new non-EMV compliant functionalities may be quickly added to existing payment-system specific kernels. In addition, by restarting the existing payment transaction instead of starting a new one, it may be quickly restarted using the same amount and the same currency without the need of any merchant interaction. By using existing mechanism already present in the EMV specifications and protocols, Users are given a higher degree of control over the payment applications used to complete payment transactions, and unexpected payments and/or unexpected terminations of payments are less likely to occur when a conflict arises between the contents of the PPSE and the POI terminal capabilities.

11 Claims, 3 Drawing Sheets

(56) References Cited

U.S. PATENT DOCUMENTS

| | | | |
|---|---|---|---|
| 2010/0051685 A1* | 3/2010 | Royyuru | G06Q 20/34 |
| | | | 235/379 |
| 2012/0109764 A1* | 5/2012 | Martin | G06Q 20/204 |
| | | | 705/17 |
| 2013/0212025 A1 | 8/2013 | Tanner et al. | |
| 2013/0317924 A1* | 11/2013 | Bush | H04W 4/80 |
| | | | 705/16 |
| 2014/0025567 A1 | 1/2014 | Rigby et al. | |
| 2014/0058860 A1 | 2/2014 | Roh et al. | |
| 2014/0222670 A1 | 8/2014 | Concannon | |
| 2016/0248479 A1 | 8/2016 | Bellenger et al. | |
| 2018/0144334 A1 | 5/2018 | Fontaine et al. | |

FOREIGN PATENT DOCUMENTS

| | | |
|---|---|---|
| KR | 1020160013618 | 2/2016 |
| WO | 2016048863 | 3/2016 |

OTHER PUBLICATIONS

EMV Integrated Circuit Card Specifications for Payment Systems: Book 1 Application Independent ICC to Terminal Interface Requirements: 1-175 (Nov. 2011).

European Search Report for European Application No. 18203146.8 entitled Non-Default Payment Application Selection During EMV-Compliant Payment Transaction Method (dated Mar. 14, 2019).

PCT International Search Report and Written Opinion from PCT Application No. PCT/US2019/052124 entitled Non-Default Payment Application Selection During EMV-Complaint Payment Transaction Method (dated Apr. 1, 2020).

* cited by examiner

NON-DEFAULT PAYMENT APPLICATION SELECTION DURING EMV-COMPLIANT PAYMENT TRANSACTION METHOD

CROSS REFERENCE TO RELATED APPLICATIONS

This application claims priority to European Application Serial No. 18203146.8, filed Oct. 29, 2018, which is incorporated herein by reference in its entirety

FIELD

The present disclosure generally relates to payment transaction methods between EMV-compliant Points of Interaction (POI) terminals and identification devices.

BACKGROUND

Electronic authorisation systems for payment transactions use standard specifications, such as those managed by EMVCo LLC which are publicly available at https://www.emvco.com/document-search. EMV is a technology toolbox that enables globally interoperable secure payments across both face-to-face and remote environments. EMV refers to all of the specifications administered by EMVCo.

EMVCo has standardized the exchange between contactless chips and POI terminals. The EMV implementation is documented, for example, in the EMV Contactless Specification, version 2.7, currently publicly available at: https://www.embco.com/emv-technologies/contactless/.

The latest version of the EMV Contactless Specifications includes:
- Book A: Architecture and General Requirements—version 2.7 (9 May 2018);
- Book B: Entry Point—version 2.7 (9 May 2018);
- Books C: Kernel Specifications—version 2.7 (9 May 2018);
- EMV Contactless Interface Specification—version 3.0 (February 2018); and
- PPSE and Application Management for Secure Element—version 1.0 (May 2017).

During recent years, chip-based payment has been changing from mainly physical, like a chipcard, to mainly virtual, such as a software application on a mobile device. Although such mobile devices (equipped with large screens, digital keyboards, fingerprint/iris scanner, etc.) are very powerful compared to a conventional chip card, the data interactions with the POI terminal must still be compliant with the EMV specifications and standards. These standardized data interactions are very limited, and make the implementation of new functionalities very difficult. Although these standards are regularly updated, it takes years before the standards are agreed and implemented.

It is an object of the invention to provide additional data interaction functionalities within the limitations of the current EMV contactless specifications.

General Statements

According to a first aspect of the present disclosure, there is provided a computer-implemented payment transaction method comprising: providing a POI terminal comprising a processor, the processor being programmed to execute payment transactions with an identification device by interaction in accordance with a standard EMV Contactless payment transaction protocol; the identification device comprising a further processor, programmed to provide a Proximity Payment System Environment (PPSE) having at least a first and a second payment application; providing a user interface, configured and arranged to provide inputs to the further processor of the identification device; commencing, by the POI terminal, an EMV-compliant payment transaction with the identification device by selecting the PPSE; receiving, by the POI terminal, parameters from the identification device associated with the first and second payment applications; determining the compatibility of the first and second payment applications for participating in the EMV-compliant payment transaction with the POI terminal; selecting, by the POI terminal, either the first or second payment application as preferred to continue the payment transaction using the compatibilities and the parameters, and communicating the POI-selected payment application to the identification device; receiving from the user interface a selection of either the first or second payment application and modifying the PPSE accordingly; receiving, by the POI terminal, an EMV-compliant response from the identification device configured and arranged to restart said payment transaction; continuing, by the POI terminal, said EMV-compliant payment transaction by selecting the modified PPSE of the identification device; and selecting, by the POI terminal, the user-selected payment application to continue the payment transaction.

By implementing such a function selection, new non-EMV compliant functionalities may be quickly added to existing payment-system specific kernels—this provides a mechanism to avoid transactions being performed using a particular payment application (or payment card) without explicit consent. By quickly providing new functionalities, the migration to improved ID devices and new payment applications may be accelerated. A first and second application represent the simplest implementation—the same approach may also be used for more than two payment applications.

In addition, by restarting the existing payment transaction instead of starting a new one, it may be quickly restarted using the same amount and the same currency without the need of any merchant interaction. By using existing mechanism already present in the EMV specifications and protocols, Users are given a higher degree of control over the payment applications used to complete payment transactions, and unexpected payments and/or unexpected terminations of payments are less likely to occur when a conflict arises between the contents of the PPSE and the POI terminal capabilities.

According to a second aspect of the current disclosure, the EMV-compliant response from the identification device (222), configured and arranged to restart said payment transaction (200), comprises one or more of the following: a Try Again indication; an End Application (with restart) indication; a communications error.

These are existing mechanisms already present in the EMV specifications and protocols, which are readily accessible at different points during Entry Point processing, including Kernel Processing.

According to a third aspect of the current disclosure, the method further comprises: before commencing the payment transaction by selecting the unmodified PPSE, a payment amount is first examined by the POI-terminal comparing the amount with transactional limits; and after restarting said payment transaction, the comparison of the payment amount with the transactional limits is bypassed.

During the Pre-Processing part of Entry Point, a payment amount is typical compared to transactional limits to determine whether the payment transaction may proceed. However, after restarting the same payment transaction, this comparison is no longer required.

According to a fourth aspect of the current disclosure, the EMV-compliant payment transaction uses Entry Point comprising a Protocol Activation step, the method further comprising: restarting said payment transaction by restarting the Protocol Activation step of the Entry Point.

Pre-Processing may also be bypassed by restarting said payment transaction by restarting the Protocol Activation step of the Entry Point.

The identification device and the user interface may also be comprised in a mobile device or a mobile telephone. The user interface may also be comprised in the POI terminal.

According to a fifth aspect of the current disclosure, the POI terminal may further comprise a POI display; the method further comprising: further prompting the user to select either the first or second payment application by providing a message on the POI display.

According to a sixth aspect of the current disclosure, the method further comprises: modifying the PPSE by: modifying one or more priority indications associated with the first and/or second payment application; and/or modifying the order associated with the first and/or second payment application.

The payment application available for use in the restarted payment transaction, or in subsequent payment transactions may be determined by modifying the PPSE parameters used by the EMV specifications and protocols.

According to a seventh aspect of the current disclosure, the method further comprises: modifying the PPSE to comprise only one payment application.

This provides a high degree of control by the User of the payment application available for use in the restarted payment transaction, or in subsequent payment transactions. Any undesired payment applications are removed from the PPSE.

According to an eighth aspect of the current disclosure, an identification device is provided, comprising a processor, the processor being programmed to execute payment transactions with a POI terminal by interaction in accordance with a standard EMV Contactless payment transaction protocol; the processor being further programmed to: provide a Proximity Payment System Environment (PPSE) having at least a first and a second payment application; provide inputs from a user interface to the processor; allow commencement, by the POI terminal, of an EMV-compliant payment transaction with the identification device by selecting the PPSE; send, to the POI terminal, parameters from the identification device associated with the first and second payment applications; receive the POI-selected payment application, selected by the POI terminal using compatibilities and parameters, to continue the payment transaction, store the user selection provided using the user interface of either the first or second payment application; send, to the POI terminal, an EMV-compliant response from the identification device configured and arranged to restart the payment transaction; allow continuation, by the POI terminal, of said EMV-compliant payment transaction by selecting the PPSE; and receiving, from the POI terminal, the user-selected payment application to continue the payment transaction.

According to a ninth aspect of the current disclosure, a mobile device is provided comprising: the identification device, and the user interface.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments, and which are not necessarily drawn to scale, wherein.

DETAILED DESCRIPTION

Figure 1:
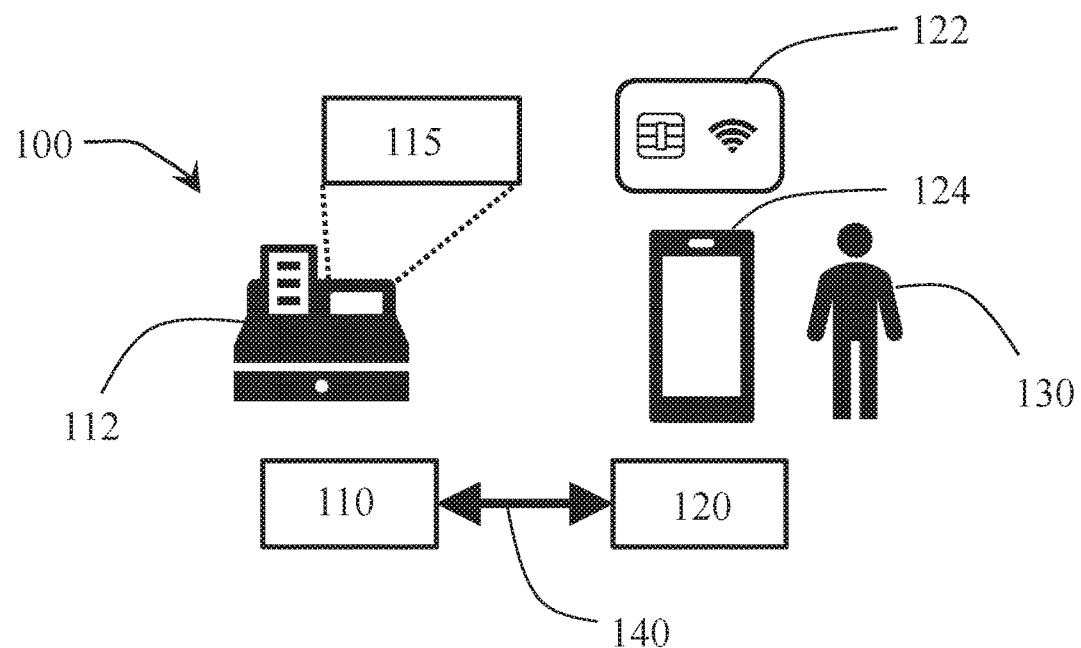
FIG. 1 depicts a typical identification transaction.

A typical payment transaction 100 is shown in FIG. 1—a User or Consumer 130 wishing to make a payment transaction may carry an identification device 120 (or "ID device"). In general, payment transactions 100 comprise an initial identification, after which an authorization transaction may also occur. An authentication transaction may also be initiated to further prove the identity of the consumer 130, although in many cases, possession of the ID device 120 is sufficient.

To initiate the payment transaction 100, a POI terminal 110 is provided comprising a processor, the processor being programmed to execute payment transactions 100 with one or more ID devices 120. In most cases, it is advantageous to support a plurality of types of ID devices 120, such as contactless ones 122, 124, to maximize convenience for consumers 130. By interacting in accordance with a standard EMV Contactless payment transaction protocol, a high degree of interoperability may be achieved.

A POI terminal 110 may be implemented in any convenient combination of hardware and software to provide interoperability with the ID devices 120 supported—for example, it is frequently comprised in a POS (Point of Sale) system 112 and ATM's. Depending on the types of ID devices 120 supported, one or more contactless interaction channels 140 may be provided to transfer data between the POI terminal 110 and the ID device 120—these may use, for example, close coupling, proximity coupling, electromagnetic radiation, visible or non-visible light, radio-frequency or any suitable combinations thereof. A POI terminal 110 may optionally comprise a POI display 115.

During the ID transaction 100, the POI terminal 110 typically first establishes whether the ID device 120 is a supported type. If so, it establishes whether the ID device 120 may be used for a payment transaction. Additionally or alternatively, other types of transactions such as an authentication transaction, an authorization transaction, a coupon-redeeming transaction, a bidding transaction, a quoting transaction, a negotiation transaction, or any suitable combinations may previously or subsequently occur.

The ID device 120, such as a contactless chipcard 122, also comprises a processor, which is also programmed to be compliant with the EMV contactless specifications and protocols to provide a high degree of interoperability.

ID devices 120 may be physical, like a chipcard 122, or virtual, such as a software application on a mobile device 124. In combination with interaction technology such as NFC or Bluetooth, a mobile device 124, such as mobile phone, may be used as a virtual contactless ID device 120 to initiate contactless transactions and to interact with merchant POI terminals 110. In particular, they may be used to initiate payment transactions 100. Such applications include, for example, Apple Pay, Android Pay, X Pay and Samsung Pay. These EMV-standardized data interactions are currently very limited—the ID device 120, even when comprised in a mobile device 124, limits itself to operation as a chipcard 122 in interactions with the POI terminal 110 to ensure a high degree of interoperability. Data interactions may also use interaction technology such as mobile data, LAN, USB, HTTP, HTTPS, XMPP, web sockets, FTP, or any combination thereof to provide one or more contactless interaction channels 140.

Figure 3:
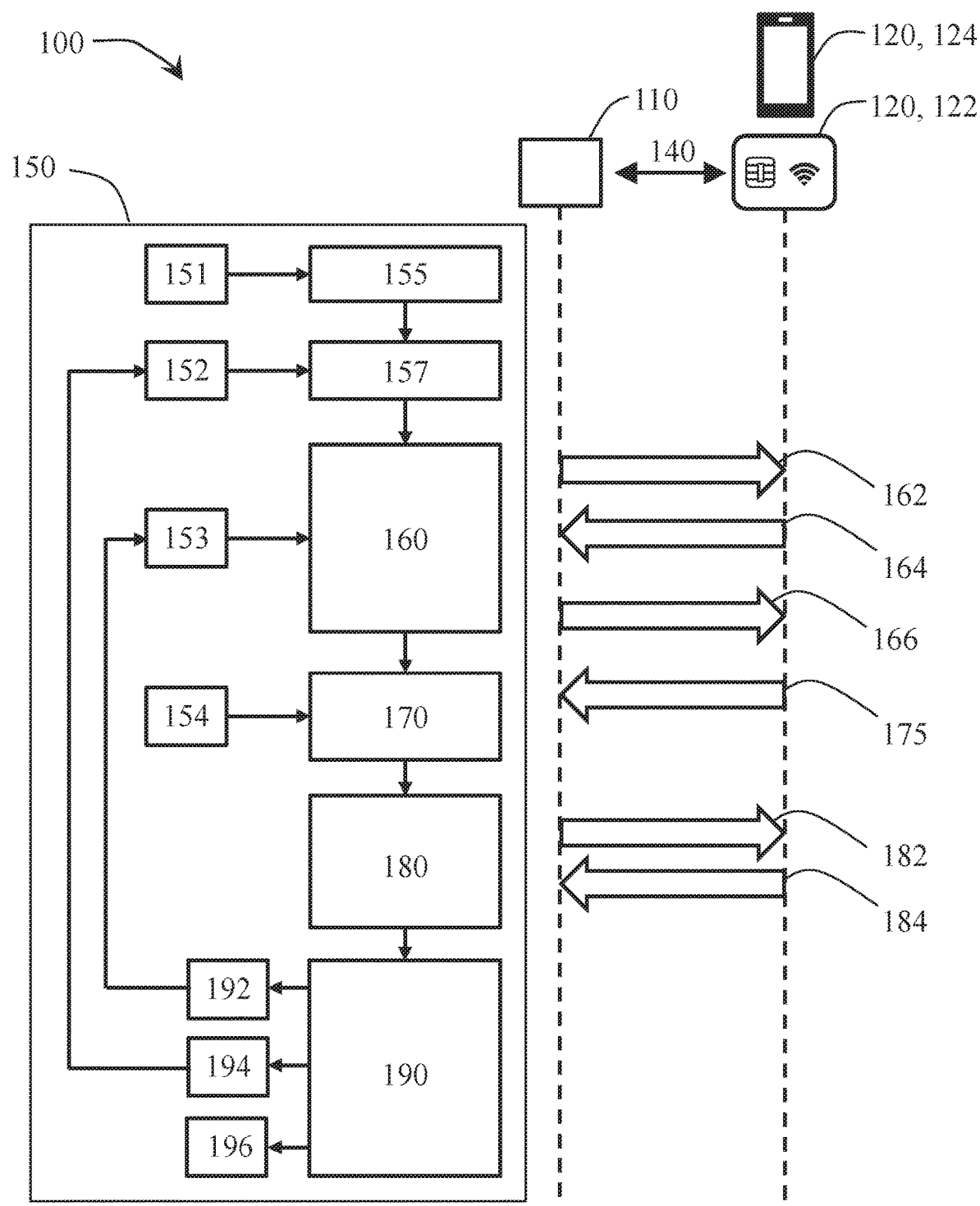
FIG. 3 depicts part of an EMV-compliant payment transaction and the Entry Point High Level Architecture.

FIG. 3 depicts the use of the High Level Architecture of Entry Point 150, as described in FIG. 3-1—version 2.7—of Book B Entry Point Specification of the EMV Contactless Specifications for Payment Systems, as part of the standard payment transaction 100. A POI terminal 110 is provided which supports interoperability with a contactless ID device 120 using a suitable contactless interaction channel 140. For example, a contactless chipcard 122 or a mobile device 124 comprising a contactless ID device 120.

Entry Point 150 comprises five main functional sections:

1) Preliminary transaction processing 155 (hereafter called Pre-Processing 155). This is processing prior to the activation 157 of the contactless interface of the reader (comprised in the POI terminal 110) and before the User (Consumer) 130 is invited to present a contactless ID device 120 such as a contactless card 122 or a mobile device 124.

2) Protocol Activation 157: This is activation 157 of the contactless interface.

3) Combination Selection 160: This is selection of the Combination 160 to use for the transaction.

4) Kernel Activation 170: Entry Point 150 activates the selected kernel 170 and this begins the kernel processing 180.

5) Outcome Processing 190: Entry Point 150 processes 190 an Outcome 192, 194, 196 according to the type of Outcome and the values of the Outcome parameters.

Entry Point 150 includes four starting points:

Start A) 151—starts at Pre-Processing 155. It is activated by the reader 110 when Autorun is 'No'. This is typical for a new transaction with a variable amount in an EMV mode acceptance environment.

Start B) 152—starts at Protocol Activation 157. It is activated in any of the following cases:
  activated by the reader 110 when Autorun is 'Yes'; this is typical for a new transaction with a fixed amount in a mag-stripe mode acceptance environment, or
  activated by the reader 110 to handle issuer responses after an Online Request 196 or End Application Outcome 196 with parameter "Start=B" 152, or
  handled internally by Entry Point 150 for an error situation, or
  handled internally by Entry Point 150 for a Try Again Outcome 194

Start C) 153—starts at Combination Selection 160. It is activated in case of being handled internally by Entry Point 150 for a Select Next Outcome 192.

Start D) 154—starts at Kernel Activation 170. It is activated by the reader 110 to handle issuer responses after an Online Request Outcome 196 with parameter "Start=D" 154.

Each Start 151, 152, 153, 154 has conditions to be satisfied by the reader 110 or POI terminal 110 before Entry Point 150 is activated. The starting points 151, 152, 153, 154 support the functional requirements of the seven EMV kernels 180.

Each new contactless transaction 100 may begin at Start A 151 or Start B 152 depending on whether the transaction amount is variable or not. A transaction amount is invariable if for the given reader 110 configuration it is the same for a plurality of transactions such that Pre-Processing 155 may be pre-computed for this plurality of payment transactions.

Entry Point 150 activates the contactless ID device 120, and selects the appropriate kernel 180, which then conducts the contactless transaction with the ID device 120, until it finishes with an Outcome 192, 194, 196.

Try Again 194 and Select Next 192 Outcomes are immediately processed by Entry Point 150, which re-starts at the appropriate point 152, 153. All other 196 Outcomes are considered to be Final Outcomes 196 and processing reverts to the reader 10 and POI terminal 110. In some cases, such as Approved 196 or Declined 196 Outcomes, the transaction 100 is completed, and no further processing from Entry Point 150 and the kernel 180 is required. In other cases, such as an Online Request 196 Outcome, then after the reader 110 and POI terminal 110 have dealt with the expected functionality, if applicable, Entry Point 150 will be started at the requested Start 151, 152, 153, 154 so that a kernel 180 may complete the transaction 100.

The various start locations 151, 152, 153, 154 and the Outcome 190 concept allows Entry Point 150 to support a wide range of kernel 180 expectations. These concepts of Entry Point 150 processing are illustrated in FIG. 3.

Entry Point 150 is designed around the use of a Proximity Payment System Environment (PPSE) as the selection mechanism. For multi-brand acceptance, this allows a reader 110 to quickly obtain all the available brands and applications with a single command and to make an immediate choice based on priority and kernel availability.

Pre-Processing 155—Start A 151

Entry Point 150 is initiated at Pre-Processing 155 for a new transaction with a variable amount. Each reader 110 Combination (In other words, an Application Identifier (AID)—Kernel ID Combination) may have a set of Entry Point 150 Configuration Data, as defined in Table 5-2 of Book A (Architecture and General Requirements), Version 2.7, April 2018 of the EMV Contactless Specification.

The Configuration Data includes Cardholder Verification Method (CVM), floor limit(s), online/offline capability, extended selection support, and contactless transaction limit.

If present, these limits are examined during Pre-Processing 155. The result is a set of flags and data elements for each Combination; one of which will be used to define the attributes of the transaction. The flags and limits referenced in this section are all part of Entry Point Configuration Data as outlined in Table 5-2 of Book A (April 2018):

Entry Point Configuration Data=For each supported type of transaction, A set of static data for Entry Point 150 processing. The value of this data is persistent and represents transactional configuration information, such as contactless limits and CVM limits. Exceptional updates happen outside of transaction processing.

This table defines the available data set for each Combination. All configured data sets will be available for Entry Point 150 processing. All elements defined in this table are optional and may be omitted from a specific instance of a combination.

Table 5-2: Entry Point Configuration Data per Combination

Status Check Support flag, if present
  Zero Amount Allowed flag, if present
  Reader Contactless Transaction Limit, if present
  Reader Contactless Floor Limit, if present
  Terminal Floor Limit (Tag '9F1B'), if present
  Reader CVM Required Limit, if present Terminal Transaction Qualifiers, if present Extended Selection Support flag, if present The indicators referenced above are all part of Entry Point 150 Pre-Processing 155 Indicators as outlined in Book A, Table 5-3.

In some reader implementations, for instance a vending machine with identically priced goods, the results of Pre-Processing 155 do not vary per transaction and are made available as configuration data for Start B 152.

Pre-Processing 155 may set the Entry Point 150 Pre-Processing 155 Indicators per reader 110 Combination (AID—Kernel ID) as defined in Book A, Table 5-3.

Entry Point 150 uses data sets during Pre-Processing 155 to compute the Entry Point 150 Pre-Processing 155 Indicators for each combination, as defined in Table 5-3.

The indicators are made available to the kernel 180 selected by Entry Point 150. Entry Point 150 temporarily stores the computed indicators to support selection of another combination for the same transaction or reactivation of a kernel 180 after an Online Request Outcome 196.

In addition to the configuration data discussed above, each kernel 180 will need data that is specific to the transaction.

Table 5-3: Entry Point Pre-Processing Indicators

Status Check Requested

Contactless Application Not Allowed

Zero Amount

Reader CVM Required Limit Exceeded

Reader Contactless Floor Limit Exceeded

Copy of TTQ (if present as part of configuration data); for definition, see Table 5-4 of Book A Entry Point 150 uses the 'Contactless Application Not Allowed' indicator to indicate that the transaction cannot take place for this Combination. A Copy of Terminal Transaction Qualifiers (TTQ) may be requested in the PDOL (with Tag '9F66' 2) of contactless applications that require this data element to obtain indication of the reader contactless capabilities and transaction requirements.

Note that during Kernel Processing 180, one or more of the checks performed during Pre-Processing 155 may be repeated or even over-ruled, such as checking the transaction amount against the Reader Contactless Transaction Limit. In other words, in some transactions 100, the results from Pre-Processing 155 may have little influence on the transaction 100.

Protocol Activation 157—Start B 152

Protocol Activation 157 may be either the next step after Pre-Processing 155, or Entry Point 150 may be started at Protocol Activation 157 for new transactions with a fixed amount or as Start B 152 after Outcome Processing 190.

During Protocol Activation 157, polling is started for the contactless ID device 120, 122, 124 discovery (if this has not already been performed) and appropriate User Interface messages may be provided. The retained Entry Point 150 Pre-Processing 155 Indicators and the Candidate List are available if required.

Combination Selection 160—Start C 153

Combination Selection 160 may be either the next step after Protocol Activation 157, or Entry Point 150 may be started at Combination Selection 160 as Start C 153 after Outcome Processing 190, 192.

Combination Selection 160 addresses the payment application (or product) and kernel selection process 170, 180.

Entry Point 150 does not rely on an exclusive link between the payment application, defined by its Application Identifier (AID), and the kernel. A single payment application may run on different kernels. Within the reader 110, a Kernel ID is used to distinguish between different kernels 180 that may be supported.

The term Kernel ID is used to identify the kernel(s) 180 kept in the reader 110, and the term Kernel Identifier (tag '9F2A') is used to identify the kernel(s) indicated by the ID device 120.

So, in addition to the AID, Entry Point 150 also needs information on which kernel 180 to activate 170. The combination of AID and Kernel ID is further referred to as a reader 110 Combination.

Following a method similar to the EMV contact application selection process, Entry Point 150 constructs a list of Combinations mutually supported by the ID device 120 and the reader 100. If multiple Combinations are supported by both ID device 120 and reader 110, Entry Point 150 selects the Combination with the highest priority.

For this purpose, the ID device 120 comprises a processor, programmed to provide a Proximity Payment System Environment (PPSE). The PPSE comprises a list of payment applications selectable over the contactless interaction channel 140.

Data exchanges between ID device 120 and POI terminal 110 are initiated using a Master-Slave protocol defined by the EMV specifications and protocols, where the POI terminal 110 acts as the Master, and the ID device 120 as the Slave. Commands are coded in bytes with a header to identify the command composed of Class byte, Instruction byte, P1 parameter byte and P2 parameter byte. The ID device 120 typically responds with a response payload, or byte array, accompanied by a Status Word of two bytes. In some cases, only a Status Word SW1 SW2 may be returned. The Status Word has the value '9000' if the command has been successfully processed by the ID device 120 and a different value if an error occurs during processing in the ID device 120.

To recover the list of payment applications, Entry Point 150 sends a SELECT (PPSE) command 162 to the ID device 120.

The first File Control Information (FCI) 164 response is provided by the ID device 120 and contains a list of ADF names and kernel ID's—in other words, the contents of the PPSE. More specifically, it contains one or more Directory Entries identifying one or more payment applications supported by the ID device 120. Each entry may comprise, as described in EMV Contactless Book B, Table 3-3:

Application Definition File (ADF) Name of the payment application optionally an Application Label an Application Priority Indicator the Kernel Identifier of the kernel 180 required for the payment application (for example, Mastercard kernel is 2)

optionally an Extended Selection (Entry Point 150 may append this data element to the ADF Name in the SELECT Command In the ID device 120, the payment application is indicated by its Application Definition File (ADF) Name.

The kernel required for a specific payment application is indicated by the Kernel Identifier (Tag '9F2A').

The priority of the Combination is indicated by means of an Application Priority Indicator with a value of '1' as the highest priority and 'F' the lowest. A value of '0' means no priority is assigned and has the same priority as 'F'.

In the reader 110, the payment application is indicated by the AID. Readers 110 must be able to link AIDs to Kernel IDs.

Entry Point 150 finds Combinations by matching pairs of data elements (ADF Name (Tag '4F') and Kernel Identifier (Tag '9F2A')) in the ID device 120 with pairs of data elements in the reader 110 (AID and Kernel ID)—matching pairs indicates compatibility.

Once all compatible (supported) Combinations have been found and the highest priority Combination has been identified, Entry Point 150 selects the associated payment application by sending a SELECT (AID) command 166.

The response to the SELECT (AID) command 166—is a second File Control Information (FCI) 175 from the ID device 120—which is received and processed by Entry Point 150, including status bytes SW1 SW2.

Combination Selection 160 may comprise the following steps:

- A Candidate List is generated of compatible Combinations by processing each Directory Entry from the first FCI 164. Each ADF name is examined to see whether is matches (full match or partial match) the AID of the reader 110 Combination. In addition, other details, such as whether the Requested Kernel ID is supported for the reader 110 Combination, may be used to decide whether a Combination is added to the Candidate List.
- If the Candidate List is empty, Entry Point sends an End Application Outcome and continues with Outcome Processing 190, 196.
- If there is only one Combination in the Candidate List, the Entry Point 150 selects this combination using the SELECT (AID) command 166.
- If there are more than one Combination in the Candidate List, the payment application priority (indicated using the Application Priority Indicator in the PPSE Directory Entry).
- The Application Priority Indicator may have the following values:
  - 0000: No priority assigned
  - xxxx: Priority order of the payment application to be selected, ranging from 1-15, with 1 being highest priority
- If a single Combination has a higher priority than any other Combination, Entry Point 150 selects this combination using the SELECT (AID) command 166.
- If multiple Combinations have the highest priority:
  - Determine the order of these Combinations' ADF Names and Kernel IDs in the PPSE, where the order is the position in the PPSE, with the lowest order being the first.
- Entry Point 150 selects the Combination with the lowest order (the first one) using the SELECT (AID) command 166.

Kernel Activation 170—Start D 154

Kernel Activation 170 may be either the next step after Combination Selection 160, or Entry Point 150 may be started at Kernel Activation 170 as Start D 154 after Outcome Processing 190. In the event that Entry Point 150 is started as Start D 154, the second FCI 175 (and the Status Word) will not be needed for the selected kernel 180.

During Kernel Activation 170, Entry Point 150 hands over control to the kernel 180 of the selected 166 Combination. Once the kernel 180 is activated, all commands and responses are processed by the kernel 180.

Kernel Activation 170 typically requires:
- Entry Point activating the kernel 180 identified in the selected 166 Combination.
- Entry Point 150 making the Entry Point 150 Pre-Processing 155 Indicators (as specified in Book A, Table 5-3) for the selected 166 Combination available to the selected kernel 180.
- Entry Point 150 making available the second FCI 175 and the Status Word SW1 SW2 to the selected kernel 180. This requirement does not apply if Entry Point 150 is restarted at Start D 154 after Outcome Processing 190.

Kernel Processing 180

The kernel processing 180 typically covers the interaction with the ID device 120 between the Final Combination Selection 166 and the Outcome Processing 190. Once activated 170, a kernel 180 continues the dialogue with the ID device 120 using the necessary command/response exchanges and may call for a User Interface Request from the reader 110 (e.g. displaying "Remove Card" on the optional POI display 115). On completion, the kernel 180 provides an Outcome 192, 194, 196 to Entry Point 150.

This ID transaction 300 proceeds as follows using the Application Protocol Data Units (APDU) as described in EMV specifications. The POI terminal 110 sends Command APDU's (C-APDU) 182 as Master to the ID device 120. The ID device 120 responds with Response APDU's (R-APDU) 184 as Slave to the POI terminal 110.

For example:
- The POI terminal 110 may send a request 182 for the processing options, to which the ID device 120 responds 184 with the file & record structure to be retrieved.
- The POI terminal 110 then reads all the indicated records by sending a request 182 for the record, to which the ID device 120 responds 184 with the contents of that record.
- This is continued, or looped, until all the indicated records have been read.
- Finally, this part of the data exchange is ended by the POI terminal 110 requesting 182 the Application Cryptogram be generated, followed by the ID device 120 responding 184 with the Application Cryptogram 344.

Further data exchange may occur between the POI terminal 110 and the ID device 120, and further identification transactions may be performed.

Outcome Processing 190, 192, 194, 196

Each kernel 180 may finish its processing 180 by providing an Outcome 190 with parameters. Some Outcomes 190, such as Try Again 194 and Select Next 192 may be processed immediately by Entry Point 150 which re-starts processing at the appropriate start 152, 153. The rest 196, such as Approved and Online Request may be passed to the reader 110 as a Final Outcome 196 together with the parameters and associated data.

In addition, for exception conditions within Entry Point 150 processing, a Final Outcome 196 may be provided directly by Entry Point 150.

There are problems with such conventional EMV-compliant contactless payment transactions 100:

Problem 1): Many contactless ID devices 120 have a PPSE comprising only one payment application, which may not be compatible with all readers 100. For example, if this payment application in the PPSE is "American Express" and the POI terminal 110 is "Mastercard" only. In such a case:
- No compatible payment application is found
- The Candidate List is empty.
- Entry Point 150 sends an End Application Outcome 196. This is considered a Final Outcome 196, terminating the current contactless transaction 100.

EMV Contactless Book A, Annex B.10 states: "the kernel (or Entry Point 150) has determined that there has been an unrecoverable error and processing should be terminated". The Start parameter is "N/A", which means that Entry Point 150 is not restarted in this case.

If the POI terminal 110 comprises a POI display 115, it may show "Insert, Swipe or Try Another Card".

The POI terminal 110 must initiate a new transaction 100—it cannot continue the existing transaction 100.

This occurs automatically, and may be inconvenient for the User 130 who does not realise that what the problem is—the User 130 is confronted by a transaction termination and failure.

A payment transaction 100 is only possible in this case by starting a new payment transaction 100, requiring in most cases the amount to be provided again. Contact is re-established with ID device 120, and Entry Point 150 Pre-Processing 155 is repeated.

Reasons for only one payment application being comprised in a PPSE include, for example:
- it is a physical chipcard 120, 122, supporting only one payment application using a contactless interaction channel 140, because that is how it was personalized and issued;
- it is a mobile device 124, such as a phone, on which only one virtual contactless card 120 has been digitized;
- it is a mobile device 124, such as a phone, supporting many digitized virtual contactless cards 120, but the User 130 has pre-selected one for a subsequent transaction 100 (for example, selected as default), and the PPSE only comprises the corresponding payment application.

Problem 2): The ID devices 120 may have a PPSE comprising only two payment applications from different issuers which may not be compatible with all readers 100. The payment applications in this case include a priority indication.

For example, if a first payment application in the PPSE is "Mastercard" and a second is "American Express", and the POI terminal 110 is "American Express" only. Note that here "first" and "second" are used in this disclosure to distinguish between two instances of a payment application—the terminology does not imply or exclude an order in the PPSE. In this case, the PPSE is programmed to provide the first payment application "Mastercard" with a higher priority than "American Express"—by, for example, the "Mastercard" Directory Entry comprising an Application Priority Indicator of 1 and the "American Express" Directory Entry comprising an Application Priority Indicator of greater than 1; or by assigning the same Application Priority Indicator to both payment applications and assigning the "Mastercard" payment application a lower order (placing it first in the PPSE); or by not assigning both Application Priority Indicators (or giving them both a value of 0000) and assigning the "Mastercard" payment application a lower order (placing it first in the PPSE); or a combination thereof. In such a case:
- Only one compatible payment application is found—"American Express"
- The Candidate List only has one entry—"American Express"
- Entry Point 150 selects this combination using the SELECT ("American Express") 166, activating the associated kernel 170, and using the kernel 180 to further process the payment transaction using the "American Express" payment application or second payment application.

This occurs automatically in this case, and may be inconvenient for the User 130 who does not realise that the lower priority payment application has been used for the payment transaction.

Problem 3): The ID devices 120 may have a PPSE comprising two payment applications from the same issuer. In this case, the payment applications include a priority indication.

For example, a first payment application in the PPSE is "Mastercard #business" and a second is "Mastercard #personal", and the POI terminal 110 is compatible with "Mastercard". In this case, the PPSE is programmed to provide the second payment application "Mastercard #personal" with a higher priority than "Mastercard #business"—by, for example, the "Mastercard #personal" Directory Entry comprising an Application Priority Indicator of 1 and the "Mastercard #business" Directory Entry comprising an Application Priority Indicator of greater than 1; or by assigning the same Application Priority Indicator to both payment applications and assigning the "Mastercard #personal" payment application a lower order (placing it first in the PPSE); or by not assigning both Application Priority Indicators (or giving them both a value of 0000) and assigning the "Mastercard #personal" payment application a lower order (placing it first in the PPSE); or a combination thereof. In this case:
- Two compatible payment applications are found—"Mastercard #personal" and "Mastercard #business"
- The Candidate List has two entries—"Mastercard #personal" and "Mastercard #business"
- Entry Point 150 selects the highest priority combination using the SELECT ("Mastercard #personal") 166, activating the associated kernel 170, and using the kernel 180 to further process the payment transaction using the "Mastercard #personal" payment application or second payment application.

This occurs automatically in this case, and may be inconvenient for the User 130 who does not realise which of the payment applications was used for the payment transaction.

Figure 2:
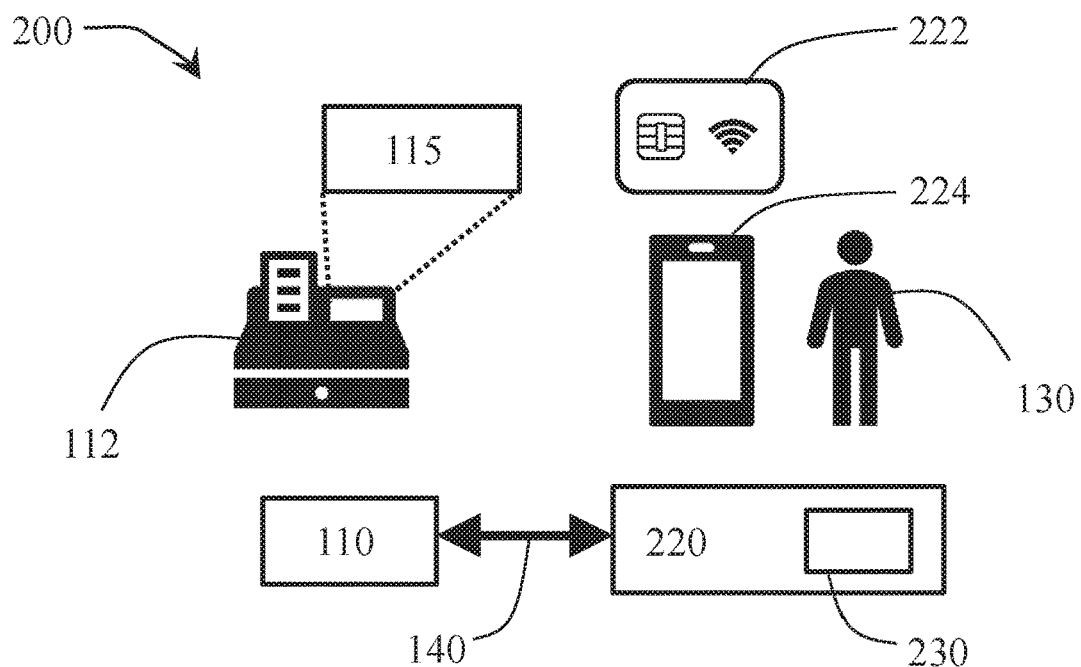
FIG. 2 depicts an improved payment transaction.

FIG. 2 depicts an improved payment transaction 200. The POI terminal 110 is provided as described above in relation to FIG. 1 and FIG. 3, and similarly programmed to interact in accordance with the standard EMV Contactless payment transaction specifications and protocols. Also, the POI terminal 110 may be comprised in a POS terminal 112 with an optional POI display 115.

The consumer 130 wishing to make a payment transaction may carry an improved contactless ID device 220—this improved device supports conventional transactions 100 in accordance with the standard EMV Contactless specifications and protocols as described above in relation to FIG. 1 and FIG. 3.

In addition, it comprises functionalities to support improved payment transactions 200 which are not described in the EMV specifications and protocols. However, the improved payment transactions 200 are configured to be performed with POI terminals 110 that comply fully with the current EMV specifications and protocols. In other words, by utilizing mechanisms present in the EMV specifications and protocols in novel and non-obvious ways, the improved contactless ID device 220 provides the User 130 with a higher degree of control over the payment applications used to complete payment transactions 200.

"Contactless" refers to the communication channels 140 used for the interaction—no electrical contact is required for this communication. However, contact for other purposes, such as physical contact (for example, tapping or holding the improved ID device 220 against part of the POI terminal 110) is not excluded by the word "contactless". Similarly, tapping or contacting the improved ID device 220, such as on a touch-screen or user interface 230, is not excluded by "contactless". Electrical connections may even be provided, for example, as a power supply for an improved contactless ID device 220 with suitable power connections to support "contactless" communication.

The improved contactless ID devices 220 may also be comprised, for example, in an integrated circuit, a bio-sensor, a medical implant, a contacted card, a portable electronic device, a SIM module, a mobile computer, a remote server, or any combination thereof. An improved ID device 220 may be wholly or partially virtual. It may also be a combination of software and/or hardware comprised in a suitably configured improved mobile device 224.

The improved ID device 220 further comprises a user interface 230, configured and arranged to allow the User 130 to provide one or more inputs.

For example, the improved ID device 220 may be:
- An improved mobile device 224 comprising the improved ID device 220 functionality and a user interface 230
- An improved contactless chipcard 222 comprising the improved ID device 220 functionality and a user interface 230
- An improved contactless chipcard 222 comprising the improved ID device 220 functionality and an improved mobile device 224 comprising a user interface 230. The improved mobile device 224 is further provided with appropriate software and/or hardware to interact with the improved contactless chipcard 222.
- An improved contactless chipcard 222 comprising the improved ID device 220 functionality. A user interface 230 may be comprised in an improved POI terminal (not shown). The improved POI terminal is further provided with appropriate software and/or hardware to interact with the improved contactless chipcard 222.

Note that the EMV specifications and protocols are directed to providing standardized interactions between a contactless ID device 120, 220 and a POI terminal 110 for creating a high degree of worldwide interoperability. In general, issuers of payment applications, contactless cards and virtual contactless cards have a high degree of freedom to determine the functionality and form of any user interface 230.

In accordance with the invention, a simple user interface 230 may be provided, such as:
- a menu, displayed on the touch screen of an improved mobile device 224, allowing a desired payment application to be directly selected by touching the entry in the menu
- two of more physical buttons on an improved contactless card 222, allowing the User 130 to press one of the buttons to directly select a desired payment application. Similarly, some other form of touch detection, such as conductivity measurement, may also be used.
- an orientation sensor comprised in an improved contactless card 222 or an improved mobile device 224, allowing a desired payment application to be directly selected by holding the card 222 or device 224 in a particular orientation
- an impact sensor comprised in an improved contactless card 222 or an improved mobile device 224, allowing a desired payment application to be directly selected by "tapping" the card 222 or device 224

As it may be advantageous to provide a user interface configured to select between only a few options, or even between two, a visual display of the options is not essential.

In addition, issuers of payment applications, contactless cards and virtual contactless cards have a high degree of freedom to determine the functionality and form of the hardware and software used for the improved ID device 220 in regard to aspects not directly related to the EMV-compliant contactless transactions.

Figure 4:
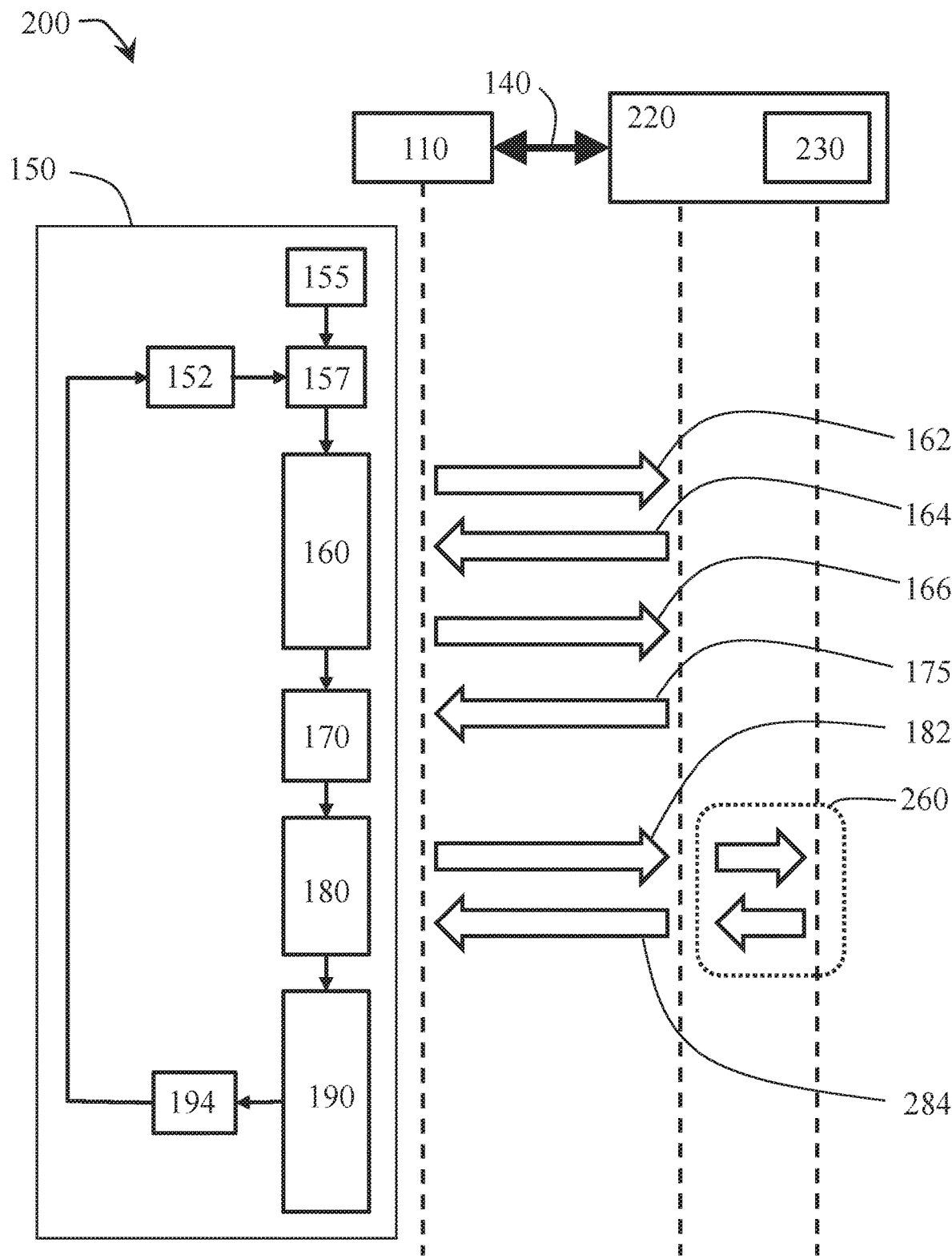
FIG. 4 depicts part of an improved EMV-compliant payment transaction and the Entry Point High Level Architecture.

FIG. 4 depicts the use of the same High Level Architecture of Entry Point 150 as depicted in FIG. 3, as part of the improved payment transaction 200. For clarity, only a portion of the High Level Architecture is depicted.

The first part of the improved payment transaction 200 is the same as described above in reference to FIG. 3. After Pre-Processing 155 and Protocol Activation 157, Combination Selection 160 is carried out:
- Entry Point 150 sends a SELECT (PPSE) command 162 to the improved ID device 220
- The first File Control Information (FCI) 164 response is provided by the improved ID device 220. It contains parameters, including the one or more Directory Entries from the PPSE, associated with one or more payment applications
- The POI terminal 110 determines, using Entry Point 150, the compatibility of the payment applications for participating in the EMV-compliant payment transaction with the POI terminal 110 in the same way as described above in relation to FIG. 3
- The POI terminal 110 selects one of the one or more payment applications as preferred to continue the improved payment transaction 200 using the compatibilities and the parameters in the same way as described above in relation to FIG.
- The POI terminal 110 communicates the POI-selected payment application to the improved ID device 220 by sending a SELECT (AID) command 166.
- A second File Control Information (FCI) response 175 from the improved ID device 220 is sent—this is received and processed by Entry Point 150, including status bytes SW1 SW2 in the same way as described above in relation to FIG. 3.
- The associated kernel 170 is activated in the same way as described above in relation to FIG. 3.
- The improved ID device 220 distinguishes itself from the conventional ID device 120 by comprising hardware and/or software configured and arranged:
  - to provide a user-configurable EMV-compliant response 194 which restarts 152 the improved payment transaction 200; and
  - to receive using the user interface 230 a selection of one of the one or more payment applications. This is the User-selected payment application. Alternatively or additionally, the user interface 230 may be further configured to prompt the User 130 to make the selection.
- This allows the user, for example, to be notified of the payment transaction to be used (the POI-selected payment application), to confirm the payment application to be used and/or to change the payment application to the User-selected payment application by modifying the PPSE and restarting 194, 152 the improved payment transaction 200.
- User-configurable EMV-compliant responses 194 which restart 152 the improved payment transaction 200 are those responses which result in the Protocol Activation 157 being restarted using a Start B 152. This restart avoids having to carry out Pre-Processing 155 which is considered the initiation of a new payment transaction, requiring in most cases the amount and currency to be specified by the merchant. It may also require communication between the POI terminal and the ID device be renegotiated. Avoiding Pre-Processing 144 and payment transaction termination is quicker and more convenient for both the merchant and the user.

For example, providing a response such that the kernel 180 generates a Try Again Outcome 194. As described in EMV Contactless, Book A, Appendix B—on completion, a kernel 180 indicates its results by means of an Outcome 192, 194, 196 and provides parameter values suited to the associated Outcome 192, 194, 196 and to the acceptance environment (EMV mode or mag-stripe mode).

EMV book A, Annex B.8 indicates that in the case of Try Again 194, the kernel 180 determines that the payment transaction should be attempted for a second time. This may also be described as prompting for a second tap to retry the transaction. Traditionally, this is used to allow entry of a Confirmation Code (for example, a PIN code) into a mobile device, and the field is turned off for 1300 ms. In the improved payment transaction 200, it may also be used to allow entry of a Confirmation Code. The Try Again Outcome 194 is processed using Outcome Processing 190 such that Protocol Activation 157 is started via Start B 152.

Try Again 194 parameters (selection)
Start: B
UI Request on Outcome Present: Yes
   Message Identifier: '20' ("See Phone for Instructions")
   Status: Processing Error
   Hold Time: 13
   Language Preference: 'en'
UI Request on Restart Present: Yes
   Status: Ready to Read
Data Record Present: No
Discretionary Data Present: Yes or No
Field Off Request: 13
Removal Timeout: zero The Try Again Outcome 194 may be triggered during Kernel Processing 180 by any convenient means. The details of Kernel Processing 180 may be configured and arranged by an issuer to support payment-system specific interactions and transactions For example, as defined in Kernel 2 Specification Book C-2, Annex A.1.124, a data object may be provided to inform the Kernel about the indicators set in the improved Mobile Device 224 that may influence the action flow. In this case, it is called "POS Cardholder Interaction Information" (POSCII). As explained in section 3.8.2, when returned by the Card, the POS Cardholder Interaction Information indicates whether:

An ACK is required, such as a button push
On-device cardholder verification (OD-CVM) is required (e.g. PIN entry)—this may be considered as a Confirmation Code;
On-device cardholder verification (OD-CVM) has been completed successfully;
The context is conflicting, meaning the cardholder device detected a discrepancy between the data used for a first tap and the data used for a second tap, the first and second tap being both part of the same transaction 200;
The application is activated, and if not, how to remedy this and activate the application;
The limits are exceeded or not;
A payment application or wallet requires a second tap;

The Try Again Outcome 194 is preferably utilized in the improved payment transaction 200 to prompt for a second tap during Kernel Processing 180 based on POSCII in situations where a user action is required: ACK is required or OD-CVM is required.

The Kernel checks the Amount, Authorized (Numeric) against the Reader Contactless Transaction Limit and returns an OUT Signal if the transaction amount is greater than this limit. The OUT Signal includes a Status value of Select Next, to request that the next AID from the candidate list should be selected.

The Kernel then checks whether the transaction amount exceeds the Reader CVM Required Limit and, if so, updates the Mobile Support Indicator accordingly.

Section 3.8.3 and 5.2.3 of Book C-2 provide more details of this example—the improved ID device 220 may be configured to return an AAC (Authentication Application Cryptogram) in response to a "GENERATE AC" command. The AAC may be accompanied by the additional data object POSCII to indicate that "CDCVM Required" or "Consent Required" or more generally "Restart Required".

Book C-2 included the following examples of states that results in a Start B 152 Try Again outcome:

State 3 (S3)—Waiting for GPO Response—in sections 6.5.2 Flow Diagram and 6.5.3 Processing—S3.5
State R1 (SR1)—Waiting for Exchange Relay Resistance Data Response—in sections 6.6.2 Flow Diagram and 6.6.3 Processing—SR1.5.2
State 4 (S4)—Waiting for EMV Read Record Response—in sections 6.8.2 Flow Diagram and 6.8.3 Processing—S4.6
State 5 (S5)—Waiting for Get Data Response in sections 6.10.2 Flow Diagram and 6.10.3 Processing—S5.6
State 7 (S7)—Waiting for Mag-stripe Read Record in sections 6.13.2 Flow Diagram and 6.13.3 Processing—S7.6
State 9 (S9)—Waiting for Generate AC Response—1 in sections 6.16.2 Flow Diagram and 6.16.3 Processing—S9.10 & S9.15
State 10 (S10)—Waiting for Recover AC Response in sections 6.17.2 Flow Diagram and 6.17.3 Processing—S10.6
State 11 (S11)—Waiting for Generate AC Response—2 in sections 6.19.2 Flow Diagram and 6.19.3 Processing—S11.17
State 12 (S12)—Waiting for Put Data Response Before Generate AC—in sections 6.20.2 Flow Diagram and 6.20.3 Processing—S12.6
State 13 (S13)—Waiting for CCC Response—1 in sections 6.21.2 Flow Diagram and 6.21.3 Processing—S13.5
State 14 (S14)—Waiting for CCC Response—2 in sections 6.22.2 Flow Diagram and 6.22.3 Processing—S14.5.

Note that "Try Again" is used in different contexts in the EMV specifications and protocols. However, the states that are relevant to this invention are the ones that result in the same payment transaction being restarted, and not those that result in a new payment transaction to be initiated.

The Kernel decision in this example restarts the same payment transaction using the POSCII data object to indicate that the User 130 should address an issue on the improved ID device 220 and present the contactless device 220 again. The status of the transaction outcome is defined as "END APPLICATION" and a UI message may be generated such as "See Phone For Instructions".

In a second example, providing a response such that the kernel 180 generates an End Application (with restart) Outcome 194. EMV book A, Annex B.11 indicates that in the case of End Application (with restart) Outcome 194, the kernel 180 requires a restart after confirmation of card removal. The End Application (with restart) Outcome 194 is processed using Outcome Processing 190 such that Protocol Activation 157 is started via Start B 152.

End Application (with restart) 194 parameters (selection)
Start: B
UI Request on Outcome Present: Yes
   Message Identifier: '21' ("Present Card Again")
   Status: Not Ready
   Hold time 13
UI Request on Restart Present: Yes
   Message Identifier: '21' ("Present Card Again")
   Status: Ready to Read
Data Record Present: No
Discretionary Data Present: Yes or No
Field Off Request: Optional
Removal Timeout: zero The End Application (with restart) Outcome 194 may be triggered during Kernel Processing 180 by any convenient means. The details of Kernel Processing 180 may be configured and arranged by an issuer to support payment-system specific interactions and transactions. States similar to those described above for the Try Again Outcome 194 may be used.

Note that the End Application Outcome 196, as described in EMV Book

A, Annex B.10 is not the same as End Application (with restart) 194—End Application Outcome 196 is a final Outcome 196 which signals an unrecoverable error and terminates the current payment transaction.

In a third example, providing a response such that the kernel 180 generates a communications error.

The communications error may be triggered during Kernel Processing 180 by any convenient means. The details of Kernel Processing 180 may be configured and arranged by an issuer to support payment-system specific interactions and transactions. Any configuration generating, for example, a "time-out" may be used:

For example, as described in Section 3.10 of Book C-2, if the timings determined by the POI terminal 110 exceed the maximum limit computed, a communication error may be generated when the Relay Resistance Protocol is supported by the improved ID device 220 and the protocol is invoked by the POI terminal 110.

In the examples above, the EMV-compliant response is provided by the improved ID device 220 during Kernel Processing 180. Alternatively or additionally, a suitable EMV-compliant response 194 may be provided during Combination Selection 160 and/or Kernel Activation 170. However, due to restrictions imposed by the EMV specifications and protocols, it may be advantageous to configure the response to be generated only during Kernel Processing 180.

Although depicted in FIG. 4 as occurring during Kernel Processing 180, prompting 260 of the user 130 to select either the one of the payment applications may be carried out at any convenient point during the improved payment transaction 200. For example, during Combination Selection 160 after the improved ID device 220 receives the SELECT (AID) command 166 indicating the POI-selected payment application.

The improved ID device 220 may determine that a situation has occurred, that requires User input 260. The improved ID device may, for example:

prompt 260 the user 130 after receiving the POI-selected payment application. If applicable, modify the PPSE and immediately restart 152 the improved payment transaction 200 by providing the appropriate EMV-compatible response 284 instead of the second FCI response 175.

prompt 260 the user 130 after receiving the POI-selected payment application. Provide the standard second FCI response 175 to activate the kernel 180 associated with the POI-selected payment application. During Kernel Processing 180, modify the PPSE and immediately restart 152 the improved payment transaction 200 by providing the appropriate EMV-compatible response 284 instead of a standard Response APDU's (R-APDU) 184.

The improved ID device 220 may be programmed to operate in many different ways in interactions with EMV-compliant POI terminals 110. The User 130 may configure more extensively the use of the improved ID device 220.

The invention reduces problem 1) by allowing the User 130 to include more than one payment application in the PPSE. The invention provides a higher degree of control, so the chance that a User 130 is surprised by either a payment transaction 200 using an unexpected payment application, or surprised by a payment transaction being declined, is greatly reduced. The invention provides a recovery mechanism to allow a second or further payment application to be used in case of mismatches between the capabilities of a POI terminal 110 and the available payment applications.

Situations in which the user may wish to be prompted 260 for input may include:

1) Always—particular for users 130 with a plurality of available payment applications, it may be advantageous to always display on a suitable configured user interface 230 the POI-selected payment application.

The user may then provide inputs 260 to the improved ID device 220 that:

a different payment application be used (User-selected payment application). The improved ID device 220 then modifies the PPSE and restarts 152 the improved payment transaction 200. This may be a payment application already present in the PP SE, or an additional software application may be used to add a new payment application. The PPSE is modified using the order of entries in the PPSE and/or the Application Priority Indicator such that the Combination Selection 160 chooses the User-selected payment application as the POI-selected payment application. Alternatively, the PPSE may be modified to only include a single entry representing the User-selected payment application.

use of the POI-selected payment application is confirmed. The improved ID device 220 provides the conventional responses, allowing the improved payment transaction 200 to continue the current improved payment transaction be terminated or declined.

2) If the POI-selected payment application is not the one indicated in the PPSE as the highest priority. This addresses Problem 2) and Problem 3) described above.

The User 130 provided input before initiating the improved payment transaction 200 that one of their payment applications should have the highest priority. This is typically done when setting up the improved ID device 220, or when adding a further payment application. The improved ID device 220 typically stores these preferences using the order of entries in the PPSE and/or the Application Priority Indicator.

The improved ID device 220 may be configured to prompt the user 260 is the POI-selected payment application is not the same as the payment application with the highest priority. As mentioned in Problem 2), this may occur when the highest priority payment application is not compatible with the POI terminal 110.

The user 130 is prompted with the POI-selected payment application, and an indication that this is not the current highest priority payment application in the PPSE.

The user 130 then provide inputs 260 to the improved ID device 220 that:
- a different payment application be used (User-selected payment application). The improved ID device 220 then modifies the PPSE and restarts 152 the improved payment transaction 200 as explained for the "Always" example.
- use of the POI-selected payment application is confirmed. The improved ID device 220 provides the conventional responses, allowing the improved payment transaction 200 to continue.
- the current improved payment transaction be terminated or declined.

The improved ID device 220 may allow the PPSE to be modified for a number of improved payment transactions, or it may be modified for only the current improved payment transaction. The Improved ID device 220 may further comprise memory to store one or more PPSE configurations. Additionally or alternatively, a suitably configured mobile device 224 may be used to store one or more PPSE configurations, and to reprogram the PPSE as required.

The PPSE may be modified using the order of entries in the PPSE and/or the Application Priority Indicator such that the Combination Selection 160 chooses the User-selected payment application as the POI-selected payment application. Alternatively, the PPSE may be modified to only include a single entry representing the User-selected payment application. Additionally or alternatively, one or more undesired payment applications may be deleted from the PPSE.

When using an improved mobile device 224 to participate in improved payment transaction 200, the number of taps required for payment may also be reduced by configuring and arranging the responses of the mobile device 224 during Kernel Processing 180. For example, a second tap may be required in the standard execution to allow the User 130 to be authenticated—implementing the invention as described above may lead to the requirement of three or more taps to complete the payment transaction 200.

Additionally or alternatively, the improved mobile device 224 may be further configured to require User authentication during the same interruption used to allow a different payment application to be selected. This may reduce the number of taps required to complete the improved payment transaction 200. The indication that an authentication is required may be made dependent on other parameters, such as the amount of the transaction. The PPSE may be modified as described to determine the priority of applications. The undesired payment application(s) may be additionally or alternatively removed from the PPSE. Advantageously, the PPSE modification is performed before the second tap, reducing the number of taps to two.

If authentication has been performed and there is no need for a further user authentication, the improved mobile device 224 may be configured to return, for example, an ARQC (Authorization ReQuest Cryptogram) that may be used to generate an authorization to the issuer, or it may decline the transaction by returning an AAC with a POSCII to indicate that CDCVM is required.

By implementing a user-configurable payment transaction restart 152 according to the invention, new functionalities may be quickly provided to the User 130 without requiring POI terminals that are no longer EMV-compliant. This is particularly advantageous for digital (mobile) devices 124 comprising one or more virtual contactless ID device 120—the current version of EMV contactless specifications and protocols provide no convenient way to pause the transaction 100 in order to select between different contactless ID devices 120 (or virtual contactless cards 120) comprised in the mobile device 124. Currently, every wallet application on the device 124 may only present one virtual contactless card 120 to avoid possible confusion about the contactless card 120 to be selected to participate in the transaction 100, and to be used to complete the payment. Conventionally, this is typically the virtual contactless card 120 selected by default, or explicitly selected by the user 130 prior to tapping.

Currently, if multiple payment applications (identified by an appropriate AID) are comprised in the PPSE of a contactless ID device 120, and multiple AIDs may be processed by a POI terminal 110, the POI terminal 110 selects the AID having the highest priority in the PPSE. If the priorities are equal, the first entry in the PPSE is selected. This is often very confusing for the User 130 who does not know in advance the capabilities of a POI terminal 110 to support a payment application, and therefore has little control, in some cases no control, of the payment application selected to complete the payment transaction 100.

Providing only one AID in the PPSE may also be considered to improve control with conventional payment transactions 100—the User 130 may select a payment application corresponding to the AID as the default payment application. However, this remains disadvantageous—if the payment application, indicated by the AID, is not supported by the POI terminal 110, the transaction 100 may be declined. The merchant must start a new transaction 100, and if the User 130 realises why the transaction 100 has been declined, the User 130 may select a different payment application as default.

By implementing a user-configurable payment transaction restart 152 according to the invention, the User 130 may be prompted to either resolve any conflict or to make a deliberate choice for a payment application without requiring a new transaction 200 to be started. So the improved payment transaction 200 is still preferred.

In particular, additional functionalities provided by mobile devices 224 may be more fully utilized to improve the convenience and usability of payment transactions for the user 130.

Additionally, an improved mobile device 224 may be further configured and arranged to inform the User 130 that he cannot pay at a POI terminal 110 because he is missing a compatible payment application (payment instrument). He may then also be provided with a download link or a button to select.

As will be obvious to the person skilled in the art, the user-configurable payment transaction restart 152 may also be used for any functionality or option useful for the user 130 during, for example, an authentication transaction, an authorization transaction, a coupon-redeeming transaction, a bidding transaction, a quoting transaction, a negotiation transaction, or any combination thereof.

As used herein and in the appended claims, the term "processor" should be understood to encompass a single processor or two or more processors in communication with each other.

The flow charts and descriptions thereof herein should not be understood to prescribe a fixed order of performing the method steps described therein. Rather the method steps may be performed in any order that is practicable. Similarly, the coding examples are used to explain the algorithm, and are not intended to represent the only implementations of these algorithms—the person skilled in the art will be able to conceive many different ways to achieve the same functionality as provided by the embodiments described herein.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

REFERENCE NUMBERS USED IN DRAWINGS

100 ID (Identification) transaction
110 POI (Point of Interaction) Terminal
112 POS (Point of Service) Terminal
115 POI display
120 Contactless ID (Identification) Device
122 Contactless Chipcard
124 Mobile Device
130 User or Consumer
140 EMV-compliant contactless interaction channel
150 Entry Point (High Level Architecture)
151 Start A
152 Start B
153 Start C
154 Start D
155 Preliminary transaction processing or Pre-Processing
157 Protocol Activation
160 Combination Selection
162 SELECT (PPSE) command
164 First File Control Information (FCI) response
166 SELECT (AID) command
170 Kernel Activation
175 Second File Control Information (FCI) response
180 Kernel Processing
182 Command APDU's (C-APDU)
184 Response APDU's (R-APDU)
190 Outcome Processing
192 Select Next Outcome
194 Try Again Outcome
196 Final Outcomes
200 Improved payment transaction
220 Improved ID Device
222 Improved Contactless Chipcard
224 Improved Mobile Device
230 User interface
260 Prompt user for input
284 Modified response TRY AGAIN

What is claimed is:

1. A computer-implemented payment transaction method comprising:
    executing payment transactions with an identification device at a processor of a POI terminal by interaction in accordance with a standard EMV Contactless payment transaction protocol;
    operating a Proximity Payment System Environment (PPSE) having at least a first and a second payment application at a further processor of the identification device;
    inputting to the further processor of the identification device via a user interface;
    commencing, by the POI terminal, an EMV-compliant payment transaction with the identification device by selecting the PPSE;
    receiving, by the POI terminal, parameters from the identification device associated with the first and second payment applications;
    determining the compatibility of the first and second payment applications for participating in the EMV-compliant payment transaction with the POI terminal;
    selecting, by the POI terminal, either the first or second payment application as preferred to continue the payment transaction using the compatibilities and the parameters, and communicating the POI-selected payment application to the identification device;
    receiving from the user interface a selection of either the first or second payment application and modifying the PPSE accordingly, before commencing the payment transaction by selecting the unmodified PPSE, a payment amount is first examined by the POI-terminal comparing the amount with transactional limits;
    receiving, by the POI terminal, an EMV-compliant response from the identification device configured and arranged to restart said payment transaction, wherein the EMV-compliant response from the identification device, configured and arranged to restart said payment transaction, comprises one or more of the following:
    a Try Again indication,
    an End Application (with restart) indication, and
    a communications error;
    continuing, by the POI terminal, said EMV-compliant payment transaction by selecting the modified PPSE of the identification device, wherein after restarting said payment transaction, the comparison of the payment amount with the transactional limits is bypassed; and
    selecting, by the POI terminal, the user-selected payment application to continue the payment transaction.

2. The method of claim 1, the EMV-compliant payment transaction using Entry Point comprising a Protocol Activation step, the method further comprising:
    restarting said payment transaction by restarting the Protocol Activation step of the Entry Point.

3. The method of claim 1, wherein:
    the identification device and the user interface are comprised in a mobile device or a mobile telephone.

4. The method of claim 1, wherein:
    the user interface is comprised in the POI terminal.

5. The method of claim 1, wherein:
    the POI terminal further comprises a POI display;
    the method further comprising:
    further prompting the user to select either the first or second payment application by providing a message on the POI display.

6. The method of claim 1, wherein the method further comprises:
    modifying the PPSE by:
    modifying one or more priority indications associated with the first and/or second payment application; and/or
    modifying the order associated with the first and/or second payment application.

7. The method of claim 1, wherein the method further comprises:
    modifying the PPSE to comprise only one payment application.

8. The method of claim 1, wherein the identification device is comprised in an integrated circuit, a bio-sensor, a medical implant, a contacted card, a contactless card, a portable electronic device, a SIM module, a mobile communications device, a mobile computer, a remote server, or any combination thereof.

9. The method of claim 1, wherein the POI terminal is configured to interact with said one of the identification devices using electrical contact, close coupling, proximity coupling, electromagnetic radiation, visible or non-visible light, NFC, RF, Bluetooth, WiFi, mobile data, LAN, USB, HTTP, HTTPS, XMPP, web sockets, FTP, or any combination thereof.

10. An identification device, comprising a processor, the processor being programmed to execute to execute payment transactions with a POI terminal by interaction in accordance with a standard EMV Contactless payment transaction protocol; the processor being further programmed to:
provide a Proximity Payment System Environment (PPSE) having at least a first and a second payment application;
receive inputs from a user interface;
allow commencement, by the POI terminal, of an EMV-compliant payment transaction with the identification device by selecting the PPSE;
send, to the POI terminal, parameters from the identification device associated with the first and second payment applications;
receive a POI-selected payment application, selected by the POI terminal using compatibilities and parameters, to continue the payment transaction,
store a user selection provided using the user interface of either the first or second payment application thereby modifying the PPSE, before commencing the payment transaction by selecting the unmodified PPSE, a payment amount is first examined by the POI-terminal comparing the amount with transactional limits;
send, to the POI terminal, an EMV-compliant response from the identification device configured and arranged to restart the payment transaction, wherein the EMV-compliant response from the identification device, configured and arranged to restart said payment transaction, comprises one or more of the following:
a Try Again indication,
an End Application (with restart) indication, and
a communications error;
allow continuation, by the POI terminal, of said EMV-compliant payment transaction by selecting the modified PPSE, wherein after restarting said payment transaction, the comparison of the payment amount with the transactional limits is bypassed; and
receive, from the POI terminal, the user-selected payment application to continue the payment transaction.

11. A mobile device comprising:
the identification device according to claim 10, and the user interface.

* * * * *